June 29, 1948.  M. H. GOWER  2,444,040

DETACHABLE PLATE, SHEET, OR COWL FASTENING DEVICE

Filed Dec. 18, 1943

INVENTOR.
Marion Hutton Gower
BY
Arnold and Mathis
ATTORNEYS

Patented June 29, 1948

2,444,040

UNITED STATES PATENT OFFICE 2,444,040

DETACHABLE PLATE, SHEET, OR COWL FASTENING DEVICE

Marion Hutton Gower, Seattle, Wash.

Application December 18, 1943, Serial No. 514,772

2 Claims. (Cl. 24—221)

1

My invention relates to the art of detachable plate, sheet, or cowl fastening devices. More particularly my invention relates to such fastening means which is characterized by (a) resiliently and most firmly holding together the plates or parts to be secured of an airplane in sliding contact to accommodate weaving of the parts, (b) relative ease of securing and unsecuring the device, and (c) economy of manufacture and installation.

The metallic skin covering of an airplane is provided with covered openings through which openings access to the mechanism of the airplane may be had. Coverings for these openings must be of a character readily permitting detachably securing in closed position. An airplane in maneuvering develops stress or strain of varying magnitude which results in much weaving and warping of the parts all of which must be taken into account in providing the fastening means. Such fastening means must permit this intermovement of the parts, and yet the parts are preferably held with such firmness that they do not allow hammering against each other and vibration resulting in noise which may interfere with detecting operative difficulties such as those of the engine. Devices in common use lack one or more of these features and particularly do not possess the necessary firmness or stiffness of holding to provide against vibration noises and they lack economy of manufacture and installation. In providing for the several features above set forth, there must not be sacrificed readiness of securing and unsecuring, sliding contact between the plates, and reliability of securing.

Furthermore, as these fastening means are employed in relatively large numbers, economy of manufacture and installation are particularly important, especially during war time when utmost efficiency both as to installation to save manpower and cost are prime requisites. Objection, particularly, obtains to devices of the prior art respecting their complicated construction and relatively high cost of installation.

The object of my invention is to provide a fastening means of the character described which particularly meets all of said requirements and which overcomes all of said objections. The spring part is preferably of a simple U-shaped design with a flattened hump intermediate its ends so that its cost is relatively small and is of such character that its installation is a simple welding operation rather than the relatively more expensive riveting operation.

The above mentioned general objects of my invention, together with others inherent in the same are attained by the device illustrated in the following drawings, the same being a preferred exemplary form of embodiment of my invention, throughout which drawings like reference numerals indicate like parts:

Figure 6:
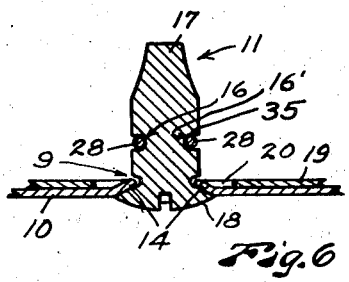
Figure 4:
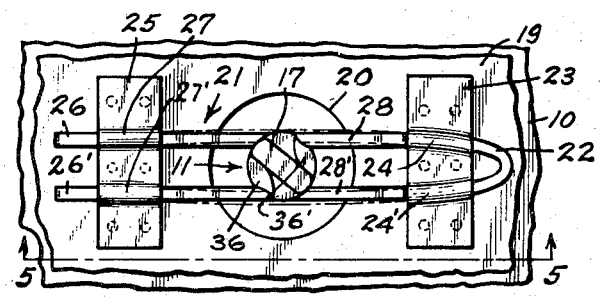
Fig. 4 is a fragmentary bottom plan view of the fastener embodying my invention showing by full and dash lines the sidewise movement of the spring member occurring while the parts of the fastener are being brought into engaging relation.
Figure 8:
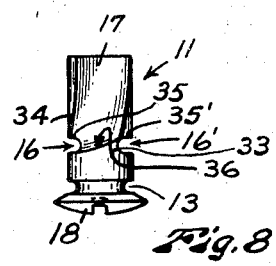
Figure 5:
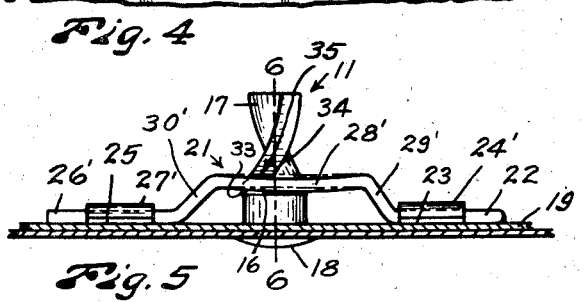
Figure 7:
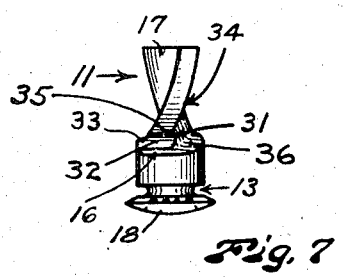

Fig. 5 is a view partly in elevation and partly in section on broken line 5—5 of Fig. 4 and indicating by dash lines the movement of the portion 28 toward plate 19 upon tightening of screw 11;

Fig. 6 is a view in section on broken line 6—6 of Fig. 5;

Fig. 7 is a detached view of the screw element in a position similar to that shown in Figs. 4 and 5; and Fig. 8 is a detached view of the screw element with the same rotated to show the somewhat flattened face of the vane of the screw element.

Figure 1:
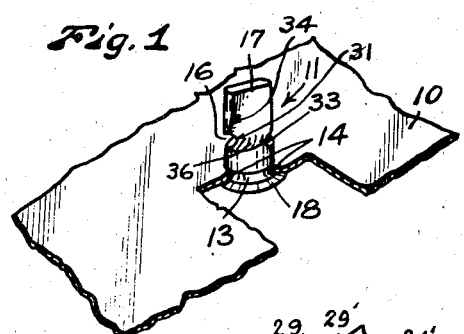
Figure 1 is a view in perspective of the screw element of my invention rotatably mounted in a fragment of a plate with a portion of the plate broken away to show the rotatable connection between the groove on the shank of the screw element and the plate.

A plate 10, which may be the plate constituating the cowl or covering of an opening, not shown, in the fuselage of an airplane or other structure, rotatably mounts the screw 11. The marginal portions 14 provide a hole or aperture 9 (see Fig. 6) in which is revolvably mounted the groove 13 of the screw 11. Preferably the marginal portions 14 of the plate 10 forming the aperture 9 are upturned, as respects the showing in Fig. 1, and the same may be accomplished by punching. Also, as the portions 14 extend into the groove 13 of the screw 11 the said screw 11 and plate 10 are secured to each other and rotary movement therebetween is permitted.

Locking groove or grooves 16, 16' (Fig. 6) are disposed substantially at right angles to the shank of the screw 11. Also, the screw 11 has a spirally disposed vane 17 at one end portion and a screw head 18 at the other end portion. Preferably the screw head 18 is adapted to lie within the recess provided by the upturned portions 14 and thus provides a flush exterior surface which does not interfere with the air stream passing the external surface of plate 10.

The second plate 19, which is the plate to which the plate 10 is to be releasably secured or fastened, provides the aperture 20 which has a diameter which is substantially greater than that of the shank of the screw 11 as clearly appears in Fig. 4. This permits sliding movement and accommodation of the parts upon movement due to the weaving of the fuselage parts under strain in flight. Operatively positioned over the aperture 20 is a spring 21, preferably of U type, having its bowed or closed end portion 22 secured to plate 19. This is preferably accomplished by welding a strip 23 over the portion 22, the strip having raised portions 24, 24' to conform to and yet of a diameter as to yieldingly hold the spring 21, but permit movement of the spring members. Another strip 25 is preferably welded over the leg portions 26, 26' of the U spring 21, said strip having raised portions 27, 27' of such diameter as to yieldingly hold the leg portions 26, 26' and permit rotation of the spring members 21 through a considerable arc. Each of the leg portions 26, 26' has a two-fold movement in that each may substantially rotate in as well as slide endwise within one of the raised portions 27, 27' of the strip 25. This preferable two-fold movement facilitates the interlocking of the fastener parts, the screw 11 and the U spring 21 as the portions 28, 28' of the spring 21 may be put under corresponding tension and the tension thus obtained may be employed against screw 21 for locking purposes. I have provided a mechanism wherein the interlocking of the parts is accomplished by utilizing both the resiliency of the spring metal and a two-fold movement of the spring parts. My mechanism provides a firmness of holding which prevents vibration noises and at the same time permits the necessary movement due to the weaving of the parts, as well as providing for ready or easy securing and unsecuring. The U-shaped spring member 21 obviously has two component spring members, i. e., two leg members and for simplicity of construction and installation preferably the U form is employed. Also, each leg member will operate as a flat spring i. e., a flat spring as compared with a coil spring, and the term is so herein employed. Also, the function of the intermediate raised portions 28, 28' is two-fold and provides for the turning movement within the spring means (i. e., portions 28, 28' may be angularly moved and thus moved toward and away from each other) upon moving the screw member 11 into and out of securing and unsecuring positions and also the raised or hump portions 28, 28' eliminate the necessity of spacer members for properly positioning the portions 28, 28' in spaced relation as respects the plate 19.

Figure 2:
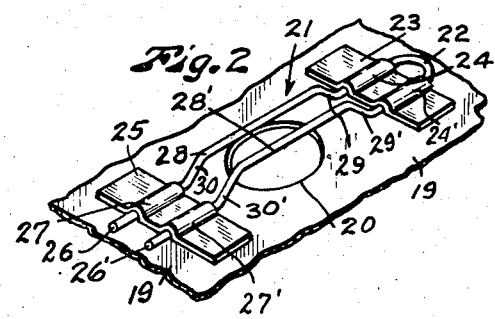
Fig. 2 is a view in perspective of the spring of simple U-shaped design with a flattened hump or raised portion intermediate its ends, mounted on a fragment of a second plate member and over the screw receiving port thereof.
Figure 3:
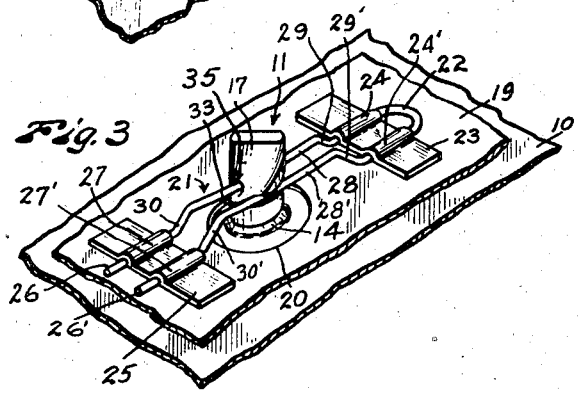
Fig. 3 is a view in perspective of parts shown in Figs. 1 and 2 in combination and with the screw element in engaging relation securing the plates together.

The intermediate portions 28, 28' of the spring 21, see Figs. 2, 3, and 5, preferably lie in a plane which is in spaced or elevated relation to the plane of the end portions of the U spring 21. The intermediate portions 28, 28' are joined to the end portions 22 and 26, 26' by inclined sections 29, 29' and 30, 30' having preferably 45° angles to the plane of the end portions 22 and 26, 26'. The inclined portions 29, 29' and the bowed portion 22 of the spring 21 operate with strip 23 in holding the bowed end portion of the spring 21 in position.

The mode of operation of a fastener embodying my invention is as follows: Plate 10 is juxtaposed upon plate 19 and vane 17 is turned so that its narrowest dimension registers with the opening between the portions 28, 28' of the U-shaped spring 21 and the screw 11 is passed through the aperture 20 and between portions 28, 28'. Then a suitable tool as a screwdriver of conventional design (not shown), or other suitably fitting tool, is applied to the head 18 and the head 18 is turned clockwise when viewed looking directly at head 18. This causes the spiral edge 34 on each side of vane 17 to engage the members 28, 28' of the U-shaped spring 21 and to draw said members 28, 28' toward the grooves 16, 16' and incidentally to spread sidewise or separate the said members 28, 28', see dash line position of Fig. 4. The portions 26, 26' of spring 21 rotate in and retract in the raised portions 27, 27' of strip 25 until the portions 28, 28' are guided by the edge portions 34 (see Fig. 5) and drop or move under the shoulders 35, 35' and into the locking grooves 16, 16' whereupon the mid portions of the intermediate portions 28, 28' are slightly depressed or displaced toward plate 19, see dash lines in Fig. 5. Thus, the resiliency of the spring parts contacted by each side of the vane 17 plus the slight rotating movement of the leg portions and plus the slight retraction of the leg portions, all combine in facilitating the fastening operation. The difference in the radial projection of the portion 31 (see Figs. 1 and 7) of the locking grooves 16, 16' and that of the flattened portions 32 (see Fig. 7) of the locking grooves 16, 16' permits the leg members of the spring to retract to rest substantially against the flattened portions 32. The shoulder 33 on each end of a locking groove 16, 16' prevents further turning of the screw 11 when moved into locking position. Also, the fastener is resiliently locked against release as the spring parts 28, 28' must be spread apart before the fastener can be released. Also substantial resistance to releasing movement of screw 11 is provided by engagement of cam surfaces 36, 36' with the spring elements 28, 28'. Upon retractile movement of screw 11, these cam surfaces 36, 36' help to spread the spring elements 28, 28' and in so doing cause said spring elements to react against shoulders 35, 35'. The entrance to the grooves 16, 16' formed between cam surfaces 36, 36' and shoulders 35, 35' is at an angle to the grooves 16, 16'. Thus the portions 28, 28' of the spring means 21 will tend to follow the radially exterior edges of the members 35, 35' and 36, 36' as the portions 28, 28' are entering and are leaving the grooves 16, 16'. This involves spreading of the portions 28, 28' as they are entering and leaving the grooves 16, 16'.

The structure described and illustrated thus obviously provides the plate member 10, the other plate member 19, a spring as one or both legs (structurally round) of spring 21, the portion or portions 28, 28' which project away from plate 19, the mounting means 23 which supports an end portion of the spring and resists turning movement thereof, the mounting means 27, 27' which permits sliding and rotary motion of another end portion of the spring means, and the screw member 11 which is connected with plate 10 and has groove means 16, 16' engageable with portions 28, 28' of the spring means.

Obviously, changes may be made in the forms, dimensions and arrangement of the parts of my invention, without departing from the principle thereof, the above setting forth only preferred forms of embodiment.

I claim:

1. In a device of the class described, the combination with a pair of plate members to be detachably secured together, each of said members having an aperture through it; of a spring member comprising two spaced and interconnected leg members round in cross section forming a U shape in plan view and with each leg member having a raised intermediate portion and which spring member is disposed with the raised intermediate portions of the leg members registering with and projecting away from the aperture of one plate member; securing means relatively fixedly securing the leg members at their interconnected ends to said one plate member and at one side of the aperture therein; sleeve bearings slidingly and rotatively connecting the unconnected end portions of the leg members with the said one plate member at the other side of the opening therein, whereby the unconnected end portions of the leg members may rotate and slide in said sleeve bearings to permit bending and sidewise movement of the raised intermediate portions of said leg members; and a screw members rotatably mounted in the aperture of the other said plate member, said screw member comprising a spiral vane portion of a size to be inserted between the said raised portions of said leg members and to engage said portions upon angular movement, whereby upon angular movement of said spiral vane portion the said intermediate portions will move relative thereto and the two plate members will move relatively toward each other, and leg member receiving grooves of substantially the same size as the leg members and disposed in and substantially at right angles to the axis of the spiral vane portion into which the intermediate portions may be urged and therein retained.

2. In a device of the class described, the combination with a pair of plate members to be detachably secured together, each of said members having an aperture through it; of a spring member comprising two spaced and interconnected leg members round in cross section forming a U shape in plan view and with each leg member having a raised intermediate portion and which spring member is disposed with the raised intermediate portions of the leg members registering with and projecting away from the aperture of one plate member; securing means relatively fixedly securing the leg members at their interconnected ends to said one plate member and at one side of the aperture therein; sleeve bearings slidingly and rotatively connecting the unconnected end portions of the leg members with the said one plate member at the other side of the opening therein, whereby the unconnected end portions of the leg members may rotate and slide in said sleeve bearings to permit bending and sidewise movement of the raised intermediate portions of said leg members; and a screw member rotatably mounted in the aperture of the other said plate member, said screw member comprising a spiral vane portion of a size to be inserted between the said raised portions of said leg members and to engage said portions upon angular movement, whereby upon angular movement of said spiral vane portion the said intermediate portions will move relative thereto and the two plate members will move relatively toward each other, and a leg member receiving recess providing a shoulder angularly disposed to the spiral vane portion back of which the intermediate portions may be urged and thereby retained.

MARION HUTTON GOWER.

REFERENCES CITED

The following references are of record in the file of this patent:

UNITED STATES PATENTS

| Number | Name | Date |
| --- | --- | --- |
| 2,204,829 | Shippee et al. | June 18, 1940 |
| 2,256,331 | Watter | Sept. 16, 1941 |
| 2,314,470 | Warren | Mar. 23, 1943 |
| 2,325,699 | Moran | Aug. 3, 1943 |
| 2,341,575 | Segal | Feb. 15, 1944 |
| 2,352,045 | Von Opel | June 20, 1944 |
| 2,364,906 | Lumsden | Dec. 12, 1944 |